United States Patent [19]

Wiggins

[11] 4,294,567
[45] Oct. 13, 1981

[54] DOWELING JIG TEMPLATE

[76] Inventor: Garfield Wiggins, 162 Burnett Ave., Maplewood, N.J. 07040

[21] Appl. No.: 2,506

[22] Filed: Jan. 11, 1979

[51] Int. Cl.³ ............................................. B23B 47/28
[52] U.S. Cl. .................................. 408/72 R; 408/72 B; 408/115 R
[58] Field of Search .............. 408/72 R, 72 B, 241 B, 408/241 G, 115 R, 115 B; 33/189

[56] References Cited
U.S. PATENT DOCUMENTS

| | | | |
|---|---|---|---|
| 1,269,811 | 6/1918 | Heritage | 33/189 |
| 2,029,650 | 2/1936 | Betz | 408/115 |
| 2,367,582 | 1/1945 | Honyoust | 408/115 X |
| 2,864,268 | 12/1958 | Anderson | 408/115 X |
| 2,884,820 | 5/1959 | Pearce | 408/72 |
| 3,204,493 | 9/1965 | Severdia | 408/241 B |
| 4,145,160 | 3/1979 | Wiggins | 408/115 R X |

FOREIGN PATENT DOCUMENTS

| | | | |
|---|---|---|---|
| 611693 | 1/1961 | Canada | 408/115 |
| 886158 | 1/1962 | United Kingdom | 408/115 |
| 1314809 | 4/1973 | United Kingdom | 408/115 |

*Primary Examiner*—William R. Briggs
*Attorney, Agent, or Firm*—Mathews, Woodbridge, Goebel, Laughlin & Reichard

[57] ABSTRACT

This invention relates to a tool to be used in connection with doweling jig(s) of my U.S. Pat. application Ser. No. 850,582 filed Nov. 11, 1977 now U.S. Pat. No. 4,145,160, to expand their utility. This tool provides support to hold the jig above and parallel to a flat surface such as a piece of lumber, plywood, particle board or the like for direct drilling of precisely positioned perpendicular dowel pin holes to mate with identically positioned holes drilled or to be drilled in an edge or end of another workpiece; said pieces forming a right angle when joined together with dowels. Another application of this tool, unrelated to doweling, is for drilling equally spaced aligned holes in a flat surface.

5 Claims, 3 Drawing Figures

DOWELING JIG TEMPLATE

THE FIELD OF THE INVENTION

This invention relates broadly to small and relatively light hand tools for use in carpentry and cabinetmaking and more particularly to a tool that is used with a doweling jig of specific construction for precision drilling of perpendicular holes in a flat surface for the purpose of making a doweled joining of an edge or end of one workpiece in a right angle relationship to the flat surface and in any desired position thereon.

THE BACKGROUND OF THE INVENTION

In my U.S. patent application Ser. No. 850,582 filed Nov. 11, 1977 now U.S. Pat. No. 4,145,160 which issued on Mar. 20, 1979 entitled Doweling Jig, a simple and accurate method is disclosed which utilizes such a jig for drilling precision holes in a flat surface for the purpose of joining with dowels an edge or end of a workpiece in a right angle relationship to that surface. This is a makeshift arrangement that needed improvement from the standpoint that a new guide is necessary each time a change is made in position or size of the dowel holes. Although other makeshift arrangements have been utilized for making this type of joining, none are known to accomplish it in a simple manner. Prior use of a template in conjunction with a doweling jig for performing this function was not revealed in prior art. The doweling boring gauge shown in U.S. Pat. No. 3,914,871 pertains to a right angle joining of an edge or end of one workpiece with a flat surface of another. This doweling boring gauge is constructed with a clamping arrangement and used with an accessory clamp, each having a spacing bar for holding the two workpieces parallel and apart while drilling mating dowel holes in the edge or end of one piece and in the face of the flat surface before moving the gauge to the next drilling position. Three matched sets of fixed position drill bushings for drilling holes ¼, 5/16 and ⅜ (all inches) diameter permit choosing the size appropriate to the thickness of the piece for edge drilling.

The doweling boring gauge of U.S. Pat. No. 3,914,871 confines a right angle doweled joining of an edge or end of a workpiece with the flat surface of another piece to a single position in which the guiding side of the perpendicular piece is flush with an edge of the flat surface and forms an outside right angle. Handling of the pieces is cumbersome since they must first be arranged in the position of their joining and then reversed for clamping and drilling. Prior to drilling the first pair of matching holes through the corresponding bushings selected, the piece must be carefully checked to make certain that the boards are squarely seated in the clamps and that they line up exactly. For the second pair of holes, the jig is moved along the workpieces and reclamped; making certain the boards are still squarely seated and in line. These steps are repeated with each repositioning of the jig. At about the halfway mark, the accessory clamp has to be moved to support the workpieces at the opposite end.

THE PURPOSE AND OBJECTS OF THE INVENTION

The principal objective of this invention is to provide a doweling jig support to hole the jig above and parallel to a flat surface for direct drilling of precisely positioned perpendicular dowel pin holes that will mate with holes drilled or to be drilled in the edge or end of a piece of lumber, plywood or particle board to form a right angle joining of the two pieces in any desired position on the flat surface.

Another object of the invention is to convert a difficult, tedious, time consuming task requiring considerable skill to one that can be easily performed with speed and accuracy.

A further object of the invention is to provide a template of simple construction, economical of manufacture, durable in use and refined in appearance that is affordable to the cabinetmaker, carpenter, homecraftsman or novice in the craft.

SUMMARY OF THE INVENTION

This invention provides a template to support in drilling position above a flat surface a doweling jig as disclosed in my U.S. patent application Ser. No. 850,582, for the purpose of drilling precision dowel pin holes for mating with holes in an edge or end piece to be joined at right angles with that surface. The template allows easy fastening to the work surface by utilizing pointed holding pins or wood screws.

The jig can be clamped on the template in either left or right-end guiding positions but no cognizance is taken of this when positioning the template on the flat surface.

The template is correctly positioned if the jig fence overlays the side that is in an aligned relationship with the face side of the perpendicular piece.

Either side of the edge or end piece can be utilized as its point of reference or face side.

When overlaying the jig fence on the face of the edge or end piece, its guiding end is always opposite to the end used on the template.

Workpieces of any size can be doweled, since the template can be repositioned any number of times on a long piece.

The hollow core or passage way construction at each jig location permits passage of drill bits. The end of each recessed portion serves as a jig end stop. Left or right-end guiding of the jig is determined by the end that abuts the stop, with the fence in alignment with one of the vertical lines scored in the bar material. These lines can be made readily visible by color contrast.

The guiding end of the jig used on the template must be transferred to the piece for edge drilling.

Guide holes for the holding pins or wood screws are close enough to each side of the template that the perforations made by the pins are concealed when pieces are joined. Wood screws are preferred for securing the template when the jig is used in more than one position.

If random drilling positions are preferred to the fixed locations on the template, corresponding marks must be made on each workpiece. With this method, the jig is clamped to the template in proper drilling position, and the unit of template and jig is moved successively to each mark on the flat surface for completion of the drilling. The unit can be held securely with the pointed holding pins and some hand pressure while drilling.

The order of drilling is unimportant, but it is essential that the correct guiding end of the dowel jig be identically positioned on each piece. This latter point makes it imperative to first determine the guiding end to be used on the template. Left end guiding on the template means right-end guiding for the edge piece and vice versa.

Materials and methods of manufacture would vary with quantities involved. Prototypes were machined in aluminum.

Individual drilling of each workpiece, as opposed to clamping them together in a reverse position, results in timesaving that is inestimable.

The simplicity of making right angle joinings as described will benefit the novice, homecraftsman, carpenter and cabinetmaker by saving time, labor and money.

In the following specifications and accompanying self-explanatory drawings, there are described and illustrated preferred and typical embodiments of the present invention but it is to be understood that the broader aspects of the present invention are not to be construed as limited to such specifically described and illustrated preferred and typical embodiments, except as defined and limited by the scope of the appealed claims.

DESCRIPTION OF THE PREFERRED EMBODIMENT OF THE INVENTION

Figure 1:
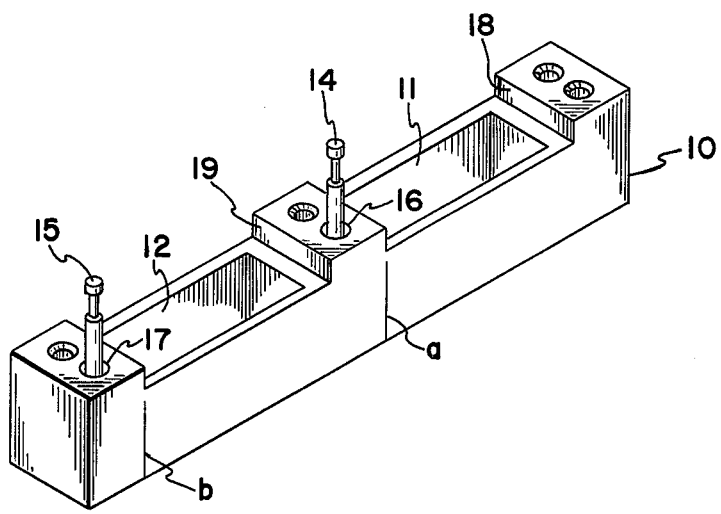
FIG. 1 is an isometric view of one form of the template of the invention.
Figure 2:
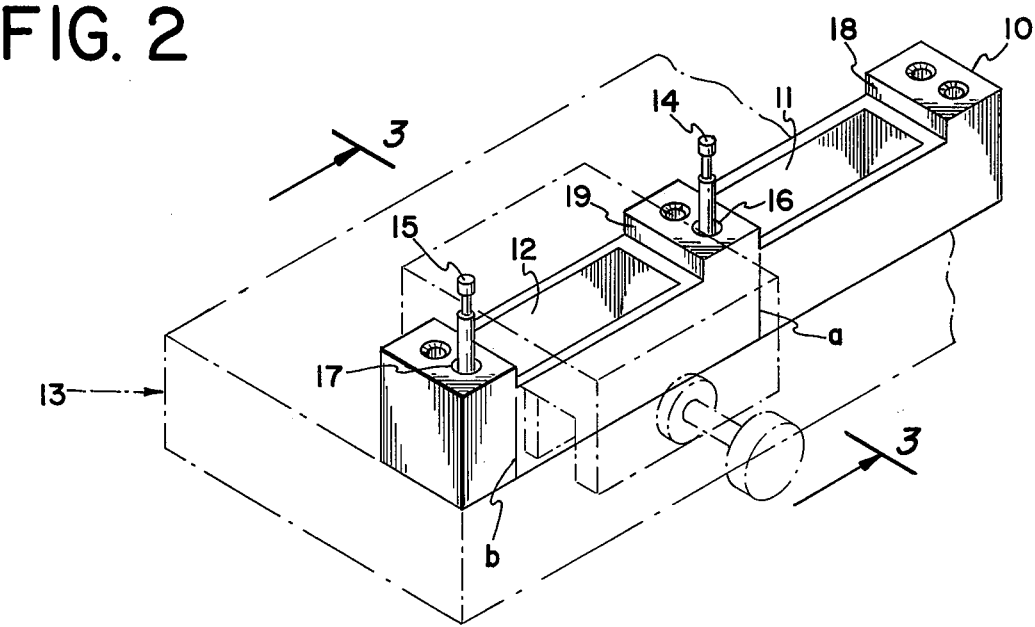
FIG. 2 is an isometric view of one form of the template of the invention showing the doweling jig and workpiece in phantom.

Referring to the drawing the template is a generally elongated bar 10, having corresponding hollow area or chamber 11, 12 extending through the bar. These chambers are for the purpose of allowing a drill bit to pass through into a workpiece which is generally indicated at 13.

Figure 3:
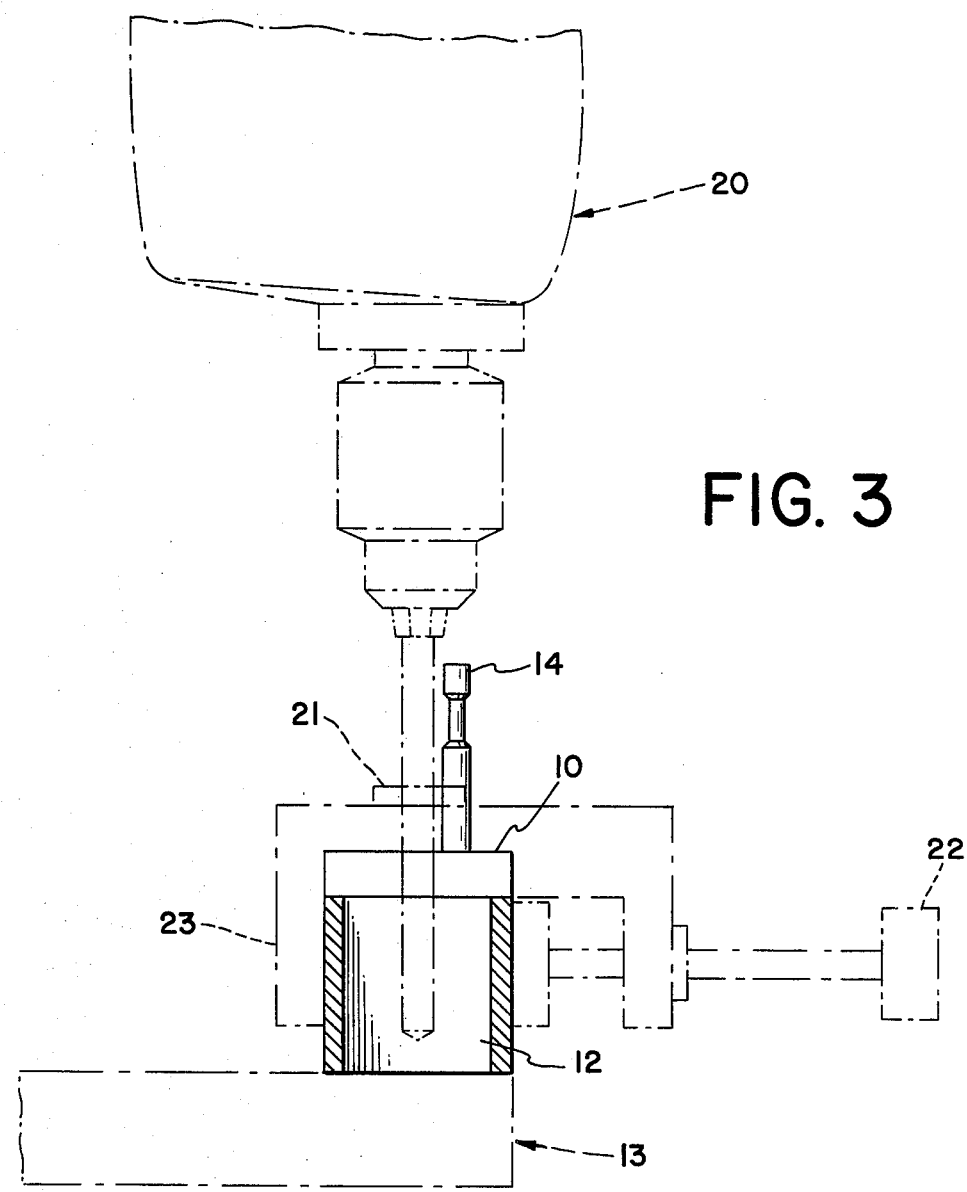
FIG. 3 is a cross sectional view taken above lines 3—3 of FIG. 2 with the addition of the dowel jig in place and a drill bit in position of joint piece to contact the stock to be drilled.

The template is secured to the workpiece 13 by means of fasteners such as screws or securing pins 14, 15. These screws or pins pass through holes 16 and 17 extending through the template bar into the workpiece. The bar 10 has recessed channel portions 18 and 19 which correspond to the location of the chambers. These recessed portions are so constructed so as to allow the dowel jig to be secured in place in the recess. Each side of the block has identically positioned vertical lines a & b which when in alignment with the jig fence determines that the jig is in its left or right-end guiding position for drilling the holes. A drill and bit generally indicated at 20 is shown in FIG. 3 with the bit passing through the bushing 21 of the dowel jig. The doweling jig has an adjustment clamp generally indicated at 22 in FIG. 3 which is used in cooperation with the rigid fence 23 of the doweling jig to hold it securely to the template by pressing against each side.

An essential element of the invention is the identically positioned index lines on each side of the template which permits a dowel jig to be clamped thereon in either left or right end guiding positions for precision drilling of perpendicular dowel pin holes in any desired position of a flat surface; said holes to mate perfectly with holes drilled or to be drilled in an edge or end of another workpiece to form a right angle joining.

Edge drilling in a workpiece greater than the clamping capacity of the dowel jig is accomplished with the template and jig combination to facilitate drilling for a right angle joining in an offset position.

Set up time for correct positioning of the template on the flat surface is negligible.

With a non-adjustable doweling jig that is ready for precision drilling when clamped on an edge or an end of a workpiece is combined with a template on which it clamps for drilling perpendicular holes in a flat surface, the result can only be a multiplicity of savings.

Any departure from the foregoing description which conforms to the present invention is intended to be included within the scope of the claims.

What is claimed is:

1. In combination a template to support a doweling jig in a position above and parallel to a flat surface for drilling longitudinally spaced series of vertical dowel holes for mating with similiarly positioned holes in an edge or end of another workpiece to be joined in a right angle relationship to a flat surface, said doweling jig characterized by a horizontally elongated channel having a flat top member and two parallel side members extending transversely to said top member, said top member having parallel ends extending transversely to said side members and having an undersurface parallel with its upper surface and having longitudinally spaced vertical guide bushings through which a drill bit can pass for making spaced holes in a piece of stock beneath said undersurface, one of said side members having attached means for clamping a template against the other side member in a position for such drilling, said template characterized by a horizontally elongated body having at least one vertical cavity to allow passage of the drill bit through the guide bushing into the flat piece of stock held in contact with the undersurface of said elongated body, a channel portion containing said cavity recessed into the upper surface of said elongated body and extending across the entire width of said upper surface and forming spaced abutments to allow precise positioning and support against movement in one horizontal direction by abutment of either end of the flat top of the dowel jig in the channel portion, and vertical guide holes at each end of said elongated body for allowing the passage of securing means for holding the elongated body in contact with the flat workpiece.

2. The combination of claim 1 wherein said elongated body has at least two cavities.

3. The combination of claim 1 wherein said elongated body has scored vertical index lines on each side of said body aligned on the outside surface of the template to correspond to the end of each cavity for correlation of the dowel jig position.

4. The combination of claim 3 wherein said vertical guide holes are positioned to be generally aligned with said vertical guide bushings so that the joined pieces conceal perforations in the flat surface made by said securing means applied through said vertical guide holes.

5. The combination of claim 4 wherein said template is characterized by a horizontally elongated body having at least one vertical cavity to allow passage of a drill bit through the dowel jig secured to the upper surface of the elongated body into a flat piece of stock on the opposite surface of the elongated body, a recessed portion on the upper surface of said elongated body containing said cavity, vertical holes at opposite ends of the elongated body aligned to allow securing the elongated body to the flat piece of stock to be drilled and securing pins for holding the elongated body in contact with the flat stock.

* * * * *